INVENTOR.
RALPH R. GRIFFEN

United States Patent Office 2,968,377
Patented Jan. 17, 1961

2,968,377

CARBURETOR MEANS FOR MAINTAINING ANY SELECTED VEHICLE SPEED

Ralph R. Griffen, Roseville, Mich., assignor to Holley Carburetor Company, Van Dyke, Mich., a corporation of Michigan Filed Feb. 17, 1958, Ser. No. 715,623

21 Claims. (Cl. 192—3)

The present invention relates generally to carburetors for internal combustion engines, and more specifically to means associated with said carburetors for maintaining any selected vehicle speed.

Many such devices have been designed; however, they all contain certain inherent undesirable characteristics. A time lag between when the throttle is depressed for acceleration and when the engine responds, and the necessity of re-setting the speed selector after acceleration occurs, are but two of these characteristics.

Accordingly, it is an object of the present invention to present means for maintaining any selected vehicle speed.

More specifically, it is an object of the present invention to present means for maintaining vehicle speed which does not in any way affect the responsiveness of the engine nor require re-setting after acceleration occurs.

Other objects and features of the invention will become apparent as the description proceeds, especially when taken in conjunction with the accompanying drawing, illustrating preferred embodiments of the invention, wherein.

Figure 1:
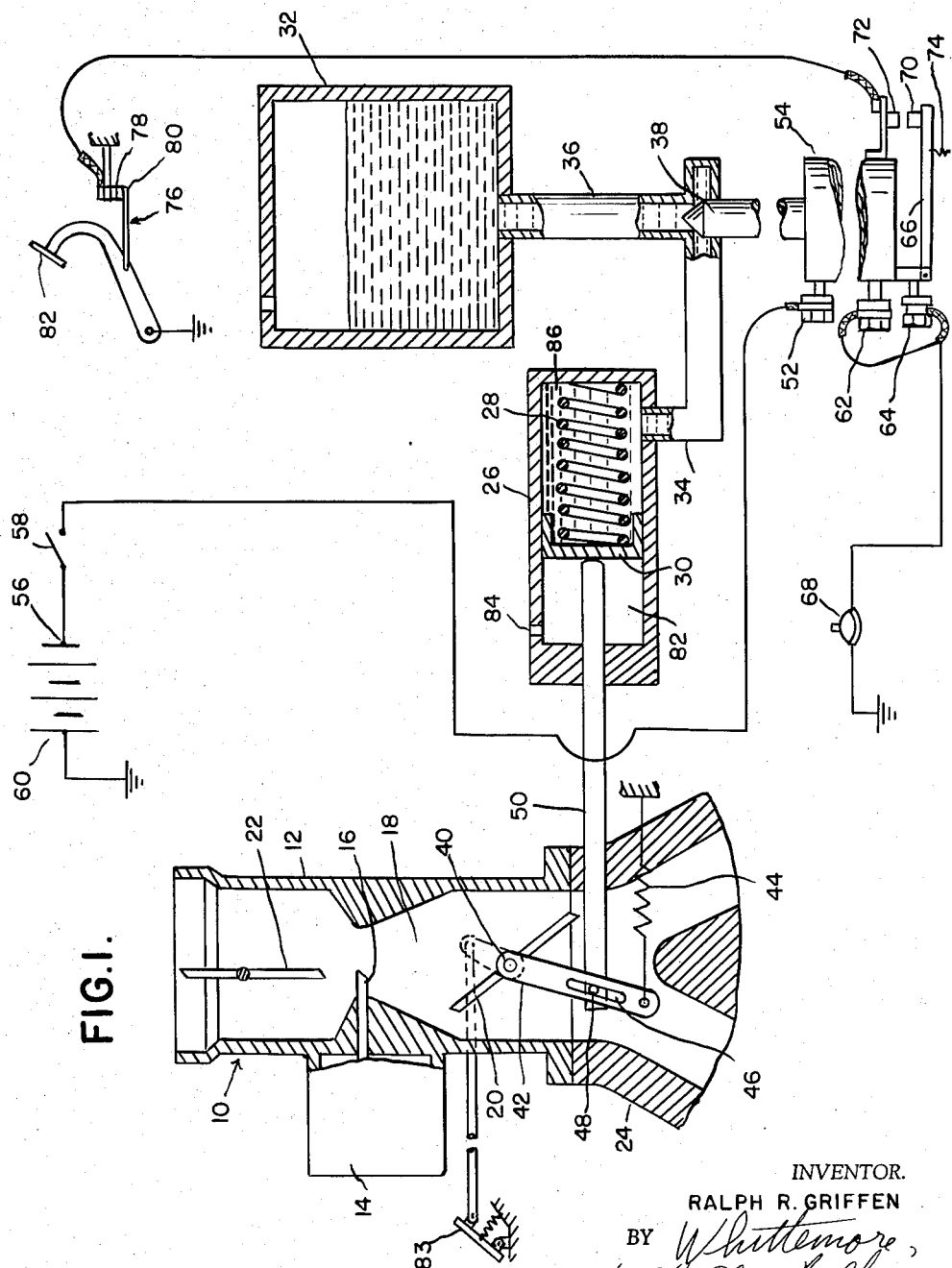
Figure 1 is a diagrammatic view, with parts in section, of the preferred embodiment of the invention.

Referring in greater detail to Figure 1, a carburetor 10 having a body 12, a fuel bowl 14 and nozzle 16 discharging into an induction passage 18 having a throttle valve 20 and choke valve 22 therein, is shown mounted on and communicating with the intake manifold 24 of an internal combustion engine.

The invention is basically composed of a cylinder 26, containing a spring 28 normally biasing a piston 30 to the left, communicating with a source of hydraulic fluid such for example as a tank or reservoir 32 by means of conduits 34 and 36 forming a passage which is controlled by a solenoid operated flow control valve 38.

The throttle valve 20 is rigidly secured to the throttle shaft 40 which has in turn an arm 42 secured to it. The throttle valve is urged toward a substantially closed position by the usual throttle return spring 44. Spring 44 is selected to be able to overcome spring 28 to provide for closure of the throttle valve 20 under certain conditions, as will later appear. The arm 42 has a longitudinal slot 46 therein adapted to slidably receive a pin 48 which is secured to one end of a rod 50. The other end of said rod extends into the cylinder 26 where it is adapted to be abutted by the piston 30 for unidirectional actuation thereby.

Terminal 52 of solenoid 54 is electrically connected to the battery 60 at 56 through the usual ignition switch diagrammatically indicated at 58. Terminal 62 of the solenoid is connected to terminal 64 of a magnetically operated, electrically conducting electrical switch arm 66. A normally open, manually closed electrical switch 68 is also connected to terminal 64; the other side of said switch being grounded in a conventional manner. Movable switch arm 66 has an electrical contact 70 which is adapted to coact with a stationary contact 72 when solenoid 54 is energized. A relatively light spring 74 is mechanically connected to but insulated from switch arm 66 to insure opening of switch 68 when the solenoid is de-energized. Contact 72 is electrically connected to a switch 76 having contacts 78 and 80 which are normally closed but adapted to be opened by actuation of the brake pedal 82.

Operation of invention

Assuming now that the vehicle is moving at a desired speed, the throttle valve will be opened to some degree by the usual accelerator pedal 83 and the rod 50 will be in an intermediate position by virtue of its connection to the throttle valve through pin 48, link 42 and throttle shaft 40. The piston 30 acting only as a sliding abutment for the rod 50 is forcibly moved to the left by spring 28 so as to be in contact with the end of said rod. The chamber 82 to the left of piston 30 is vented to the atmosphere by means of port 84. The solenoid at this time is de-energized and valve 38 is open, permitting hydraulic fluid to flow to completely fill the chamber 86 to the right of piston 30.

If the operator desired to maintain this speed, he momentarily depresses the button of switch 68 thereby closing it and completing an electrical circuit from battery 60 through solenoid 54 to ground. At this time the magnetic field created by solenoid 54 attracts switch arm 66 to close contacts 70, 72 thereby completing a holding circuit through switch arm 70 and switch 76 which keeps the solenoid energized until the brake pedal 82 is depressed or ignition switch 58 is opened. The solenoid 54 while energized holds the valve 38 upwardly against an appropriate seat thereby shutting off any possible flow of fluid from or to the tank 32.

As the operator releases the foot throttle control 83 the return spring 44 tends to move the throttle back to a substantially closed position. Such closing movement of the throttle 20 is prevented because the fluid behind the piston 30 is trapped by closure of valve 38.

It can readily be seen that the vehicle can be accelerated without changing the pre-selected setting. As the throttle is opened, the rod 50 and piston 30 will move to the left; however, when acceleration has occurred and the throttle is allowed to return towards its closed position, the piston 30 will again be restricted from further movement at precisely the same point as the original setting because of the volume of trapped hydraulic fluid.

When the vehicle has to be stopped, the brake pedal 82 is depressed in the normal manner. This causes switch 76 to open thereby opening the electrical circuit through the solenoid 54. When this occurs, the valve 38 again opens conduit 36 and allows the fluid to pass back to tank 32 and at the same time the spring 74 opens the magnetically actuated switch 66. The throttle return spring 44 being much stronger than spring 28 causes the rod 50 and piston 30 to move to the right, thereby compressing spring 28 and returning the fluid from chamber 86 to the tank or reservoir 32.

Figure 2:
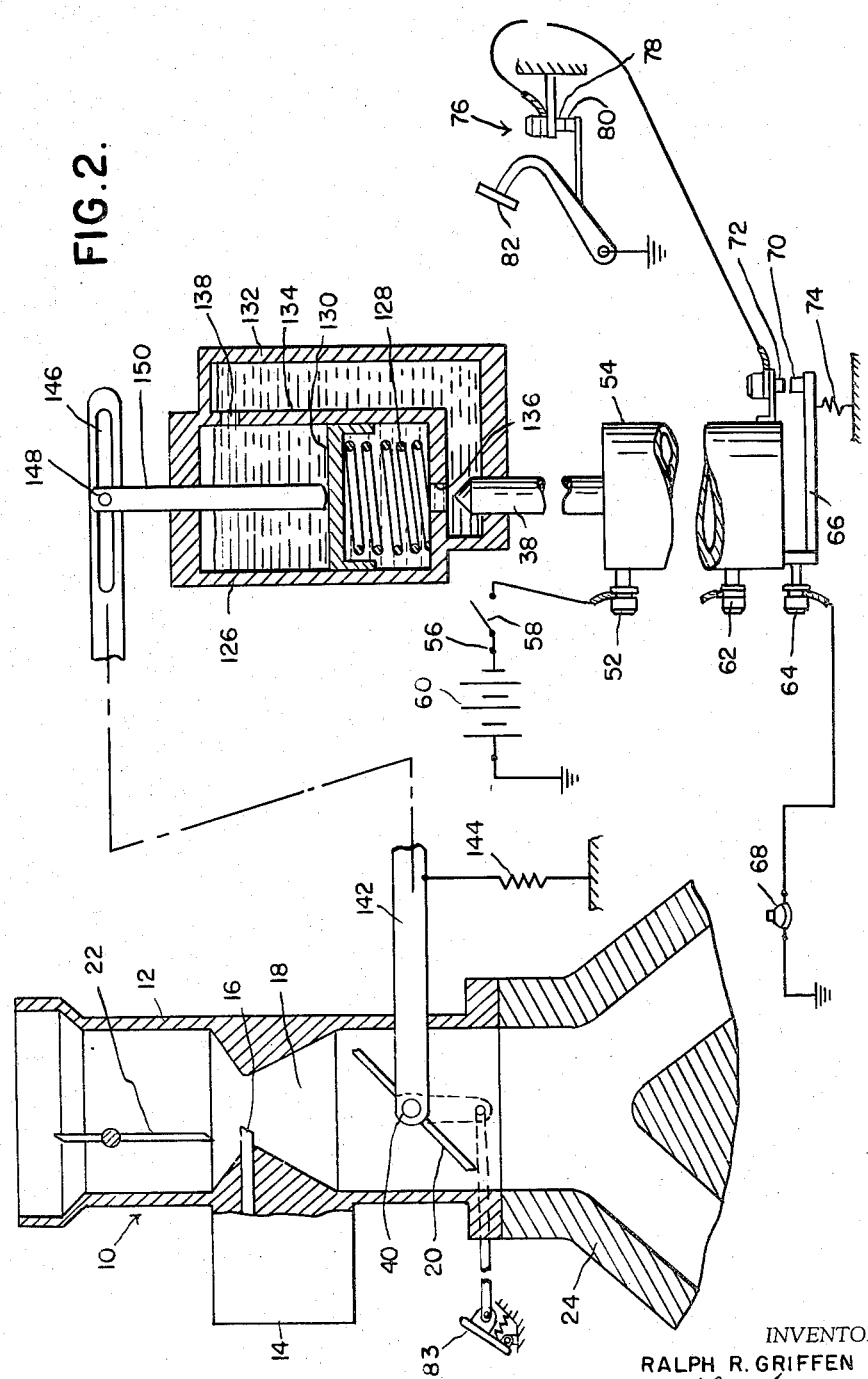
Figure 2 is a view similar to Figure 1, of a modification of the invention.

The modification of the invention as disclosed in Figure 2 is similar to that of Figure 1 in many respects. All elements which are alike or similar to those of Figure 1 are identified with like numerals. The modification principally is in the fluid reservoir construction and cylinder.

In this embodiment of the invention a combined reservoir and operating piston is provided. Cylinder 126 contains a spring 128 which urges piston 130 upwardly as seen in Figure 2. The cylinder 126 is partly contained in reservoir 132, having a common wall 134 therewith. A port 136 at the bottom of cylinder 126 communicates with the interior of the reservoir 132 and is adapted to be closed by solenoid actuated valve 38. Adjacent the top of the cylinder 126 is a second open port 138 communicating with the interior of the reservoir 132.

Shaft 40 of the throttle valve has arm 142 extending therefrom to which is connected spring 144, capable of overcoming spring 128. Arm 142 is slotted at 146 and receives connecting pin 148 carried by piston rod 150, connected to piston 130.

The operation of this embodiment is the same as that of the embodiment illustrated in Figure 1, except that the combined piston and reservoir is arranged such that hydraulic fluid is present on both sides of the piston 130, so that any seepage past the piston to the space above the piston is returned to the reservoir through port 138.

Figure 3:
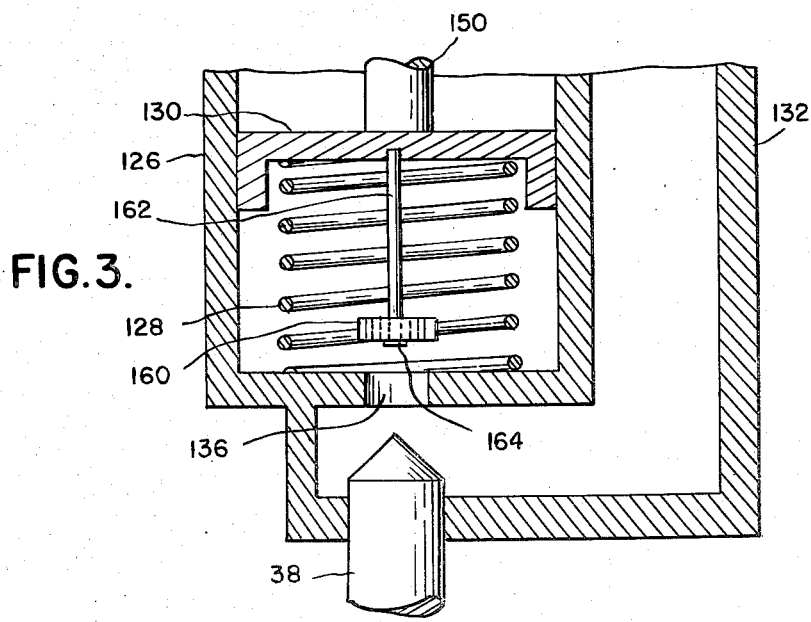
Figure 3 is a fragmentary sectional view of a part embodied in yet another modification of the invention.
Figure 4:
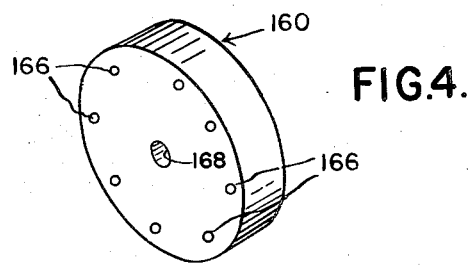
Figure 4 is an enlarged perspective view of one of the elements within Figure 3.

Figures 3 and 4 illustrate a modification of Figure 2, comprising the addition of a metering element 160 which supplies a dash-pot function to the operation. The metering element 160 is slidably retained on a rod 162 which is rigidly secured at one end to the piston 130 and which has a head or abutment 164 at its other end. The rod 162 and metering element 160 are positioned so as to be in substantially axial alignment with port 136.

The metering element 160, as best seen in Figure 4, has a plurality of metering ports 166 spaced radially from the central hole 168 thereof. When the vehicle is braked piston 130 rapidly returns to a position which allows the throttle valve to come to a closed position. However, in some instances a dash-pot effect acting on the throttle valve is desired to delay or slow down throttle closing movement. Therefore, as the piston 130 begins to move from the position shown in Figure 3 its initial rate of return is high. This relatively fast rate is continued until the metering element 160 covers the port 136 at which time the flow of fluid through said port will be reduced as a result of the restriction afforded by metering ports 160. The piston 130 continues to move downward and rod 162 moves a corresponding amount through the hole 168 of the element 160, until the throttle valve reaches a substantially closed position.

The drawing and the foregoing specification constitute a description of the improved carburetor means for maintaining any selected vehicle speed in such full, clear, concise and exact terms as to enable any person skilled in the art to practice the invention, the scope of which is indicated by the appended claims.

What I claim as my invention is:

1. A throttle positioning system for an automotive vehicle having a brake pedal, an internal combustion engine having a throttle valve provided with a spring effective to move said throttle valve to closed position, an accelerator pedal, and means providing a throttle opening connection between said accelerator pedal and throttle valve; said system comprising an expansible hydraulic chamber having a movable wall, positive mechanical connecting means between said wall and throttle valve adapted to move said wall in the direction to decrease the volume of said chamber upon throttle closing movement, passage means providing for flow of hydraulic fluid to and from said expansible hydraulic chamber, and an operator controlled valve member effective to close said passage means to prevent discharge of fluid from said chamber to thereby prevent closing movement of the throttle valve from the position occupied upon closing of said valve member.

2. A throttle positioning system for an automotive vehicle having a brake pedal, an internal combustion engine having a throttle valve provided with a spring effective to move said throttle valve to closed position, an accelerator pedal, and means providing a throttle opening connection between said accelerator pedal and throttle valve; said system comprising an expansible hydraulic chamber having a movable wall, positive mechanical connecting means between said wall and throttle valve adapted to move said wall in the direction to decrease the volume of said chamber upon throttle closing movement, said connecting means being unidirectional to provide for opening movement of the throttle valve for brief acceleration, passage means providing for flow of hydraulic fluid to and from said expansible hydraulic chamber, and an operator controlled valve member effective to close said passage means to prevent discharge of fluid from said chamber to thereby prevent closing movement of the throttle valve from the position occupied upon closing of said valve member, said movable wall being operable to reposition the throttle valve in its preselected position when released by the operator after the said brief acceleration.

3. A throttle positioning system for an automotive vehicle having a brake pedal, an internal combustion engine having a throttle valve provided with a spring effective to move said throttle valve to closed position, an accelerator pedal, and means providing a throttle opening connection between said accelerator pedal and throttle valve; said system comprising an expansible hydraulic chamber having a movable wall, positive mechanical connecting means between said wall and throttle valve adapted to move said wall in the direction to decrease the volume of said chamber upon throttle closing movement, means for supplying hydraulic fluid to said chamber comprising a passage, an operator controlled valve member effective to close said passage to prevent discharge of fluid from said chamber to thereby prevent closing movement of the throttle valve from the position occupied upon closing of said valve member, and means actuated by the brake pedal of the vehicle to open said valve member to permit closure of the throttle valve by its spring.

4. A throttle positioning system for an automotive vehicle having a brake pedal, an internal combustion engine having a throttle valve provided with a spring effective to move said throttle valve to closed position, an accelerator pedal, and means providing a throttle opening connection between said accelerator pedal and throttle valve; said system comprising an expansible hydraulic chamber having a movable wall, positive mechanical connecting means between said wall and throttle valve adapted to move said wall in the direction to decrease the volume of said chamber upon throttle closing movement, passage means providing for flow of hydraulic fluid to and from said expansible hydraulic chamber, an operator controlled valve member effective to close said passage means to prevent discharge of fluid from said chamber to thereby prevent closing movement of the throttle valve from the position occupied upon closing of said valve member, means actuated by the brake pedal of the vehicle to open said valve member to permit closure of the throttle valve by its spring, and means operable at a predetermined part throttle position to delay throttle movement to fully closed position.

5. A system as defined in claim 4 in which said delay means comprises a flow restricting element movable into position over said discharge port.

6. A system as defined in claim 4 in which said delay means comprises a flow restricting element carried by said movable wall and movable thereby into position over said discharge port.

7. A throttle positioning system for an automotive vehicle having a brake pedal, an internal combustion engine having an ignition switch and a throttle valve provided with a spring effective to move said throttle valve to closed position, an accelerator pedal, and means providing a throttle opening connection between said accelerator pedal and throttle valve; said system comprising an expansible hydraulic chamber having a movable wall, positive mechanical connecting means between said wall and throttle valve adapted to move said wall in the direction to decrease the volume of said chamber upon throttle closing movement, means for supplying hydraulic fluid to said chamber comprising a passage, an operator controlled valve member effective to close said passage to prevent discharge of fluid from said chamber to thereby prevent closing movement of the throttle valve from the position occupied upon closing of said valve member, said valve member comprising a solenoid operable when energized to move said valve member to closed position, a control circuit for said solenoid including a normally open operator controlled selector switch, and a holding circuit for said solenoid in parallel with said selector switch including a normally closed switch adapted to be opened by depression of the vehicle brake pedal.

8. A throttle positioning system for an internal combustion engine having a throttle provided with a closing spring and operator actuated opening mechanism, said system comprising a cylinder, a piston in said cylinder, a push rod connected to the engine throttle and having an end extending into said cylinder in position to abut said piston and movable toward said piston on closing movement of the throttle, a spring in said cylinder biasing said piston toward said rod end, but ineffective to overcome the throttle closing spring, a passage providing for flow of hydraulic fluid to and from said cylinder, and an operator controlled valve member adapted to close said passage to block flow of fluid out of said cylinder to thereby prevent closing movement of the throttle valve from the position occupied when said valve member was closed.

9. A throttle positioning system for an internal combustion engine having a throttle provided with a closing spring and operator actuated opening mechanism, said system comprising a cylinder, a piston in said cylinder, a push rod connected to the engine throttle and having an end extending into said cylinder in position to abut said piston and movable toward said piston on closing movement of the throttle, a spring in said cylinder biasing said piston toward said rod end, but ineffective to overcome the throttle closing spring, a passage providing for flow of hydraulic fluid to and from said cylinder, and an operator controlled valve member adapted to close said passage to block flow of fluid out of said cylinder to thereby prevent closing movement of the throttle valve from the position occupied when said valve member was closed, said rod end being freely movable away from said piston to permit brief operator controlled acceleration by opening movement of the throttle, the throttle spring being effective to return said throttle, rod and piston to the positions occupied when said valve member was closed.

10. A throttle positioning system for an internal combustion engine having a throttle provided with a closing spring and operator actuated opening mechanism, said system comprising a cylinder, a piston in said cylinder, a push rod connected to the engine throttle and having an end extending into said cylinder in position to abut said piston and movable toward said piston on closing movement of the throttle, a spring in said cylinder biasing said piston toward said rod end, but ineffective to overcome the throttle closing spring, a passage providing for flow of hydraulic fluid to and from said cylinder, an operator controlled valve member adapted to close said passage to block flow of fluid out of said cylinder to thereby prevent closing movement of the throttle valve from the position occupied when said valve member was closed, and means actuated by braking the vehicle to move said valve member to open position.

11. A throttle positioning system for an internal combustion engine having a throttle provided with a closing spring and operator actuated opening mechanism, said system comprising a cylinder, a piston in said cylinder, a push rod connected to the engine throttle and having an end extending into said cylinder in position to abut said piston and moveable toward said piston on closing movement of the throttle, a spring in said cylinder biasing said piston toward said rod end, but ineffective to overcome the throttle closing spring, a passage providing for flow of hydraulic fluid to and from said cylinder, an operator controlled valve member adapted to close said passage to block flow of fluid out of said cylinder to thereby prevent closing movement of the throttle valve from the position occupied when said valve member was closed, and valve means operable in a predetermined part throttle position to restrict flow of fluid out of said cylinder to delay full closing of the throttle when said valve is opened.

12. In piston controlled blocking means for preventing throttle closing movement from a pre-selected position comprising a cylinder having a piston therein, movable abutment means including said piston to prevent movement of a manually positioned member connected to said throttle in throttle closing direction, a reservoir having fluid passages connected to said cylinder at opposite sides of said piston, resilient means urging said piston in a direction to cause said abutment means to follow up opening movement of the throttle connected member, and an operator controlled valve member in one of said passages adapted to prevent movement of said piston in one direction.

13. In piston controlled blocking means for preventing throttle closing movement from a pre-selected position comprising a cylinder having a piston therein, movable abutment means including said piston to prevent movement of a manually positioned member connected to said throttle in throttle closing direction, a reservoir having fluid passages connected to said cylinder at opposite sides of said piston, resilient means urging said piston in a direction to cause said abutment means to follow up opening movement of the throttle connected member, and an operator controlled valve member in one of said passages adapted to prevent movement of said piston in the direction in which it moves to permit throttle closing movement.

14. In piston controlled blocking means for preventing throttle closing movement from a pre-selected position comprising a cylinder having a piston therein, movable abutment means including said piston to prevent movement of a manually positioned member connected to said throttle in throttle closing direction, a reservoir partly surrounding said cylinder and having a common wall therewith at opposite sides of the piston therein, ports extending through said common wall at opposite sides of said piston, resilient means urging said piston in a direction to cause said abutment means to follow up opening movement of the throttle connected member, and an operator controlled valve member in one of said passages adapted to prevent movement of said piston in one direction.

15. In an automotive vehicle having a movable speed control member, a pedal connected to said member for moving said member in speed increasing direction, resilient means connected to said member effective to move said member in speed reducing direction upon release of said pedal, an expansible chamber having a movable wall, rigid means extending between said movable wall and said speed control member effective to move said movable wall in a direction to decrease the volume of said chamber upon movement of said speed control member in a direction to reduce speed, resilient means connected to said movable wall urging said wall in a direction to increase the volume of said chamber, a source of hydraulic fluid, a passage connecting said source of hydraulic fluid to said chamber, and an operator controlled valve effective to close said passage to prevent escape of hydraulic fluid from said chamber and effective thereby to prevent movement of said speed control member in a speed reducing direction.

16. Apparatus as defined in claim 15 in which said vehicle includes a brake, solenoid means for actuating said valve, switch means for controlling said solenoid including an operator controlled switch and a switch actuated by operation of said brake, said switch means being effective to energize said solenoid to close said valve to thereby maintain said speed control member in whatever adjusted position it then occupied and to de-energize said solenoid and open said valve to permit movement of said speed control member in a speed decreasing direction upon initial operation of said brake.

17. A throttle positioning system for an internal combustion engine having a throttle valve and operator actuated opening mechanism, said system comprising an expansible hydraulic chamber having a movable wall, positive mechanical connecting means between said wall and said throttle valve adapted to move said wall in the direction to decrease the volume of said chamber upon closing movement of said throttle valve, passage means providing for flow of hydraulic fluid to and from said expansible hydraulic chamber, and an operator controlled valve member adapted to close said passage means to prevent discharge of fluid from said chamber and thereby prevent closing movement of said throttle valve from the position occupied upon closing of said valve member.

18. A throttle positioning system for an internal combustion engine having a throttle valve and operator actuated opening mechanism, said system comprising a hydraulic motor comprising relatively movable piston and cylinder elements, positive mechanical connecting means between said throttle valve and a movable one of said elements adapted to move said one movable element relative to the other in a direction to decrease the volume of said cylinder upon closing movement of said throttle valve, passage means providing for flow of hydraulic fluid to and from said cylinder, and operator controlled valve member effective to close said passage means and to prevent discharge of fluid from said chamber and thereby prevent closing movement of said throttle valve from the position occupied upon closing of said valve member.

19. In an automotive vehicle having a brake and a movable speed control member, a pedal connected to said member for moving said member in speed increasing direction, resilient means connected to said member effective to move said member in speed reducing direction upon release of said pedal, an expansible chamber having a movable wall, rigid means extending between said movable wall and said speed control member effective to move said movable wall in a direction to decrease the volume of said chamber upon movement of said speed control member in a direction to reduce speed, resilient means connected to said movable wall urging said wall in a direction to increase the volume of said chamber, a source of hydraulic fluid to said chamber, and an operator controlled valve effective to close said passage to prevent escape of hydraulic fluid from said chamber and effective thereby to prevent movement of said speed control member in a speed reducing direction, and valve opening means connected to said valve and actuated by said brake.

20. A throttle positioning system for an internal combustion engine having a throttle provided with a closing spring and operator actuated opening mechanism, said system comprising a cylinder, a piston in said cylinder, a push rod connected to the engine throttle and having an end extending into said cylinder in position to abut said piston and movable toward said piston on closing movement of the throttle, a spring in said cylinder biasing said piston toward said rod end, but ineffective to overcome the throttle closing spring, a passage providing for flow of hydraulic fluid to and from said cylinder, an operator controlled valve member adapted to close said passage to block flow of fluid out of said cylinder to thereby prevent closing movement of the throttle valve from the position occupied when said valve member was closed, and valve means including a metering element carried by and spaced from said piston said element operable in a predetermined part throttle position to restrict flow of fluid out of said cylinder to delay full closing of the throttle when said valve is opened.

21. A throttle positioning system for an internal combustion engine having a throttle provided with a closing spring and operator actuated opening mechanism, said system comprising a cylinder, a piston in said cylinder, a push rod connected to the engine throttle and having an end extending into said cylinder in position to abut said piston and movable toward said piston on closing movement of the throttle, a spring in said cylinder biasing said piston toward said rod end, but ineffective to overcome the throttle closing spring, a passage providing for flow of hydraulic fluid to and from said cylinder, an operator controlled valve member adapted to close said passage to block flow of fluid out of said cylinder to thereby prevent closing movement of the throttle valve from the position occupied when said valve member was closed, valve means including a rod connected to said piston and a metering element slidably carried by said rod, said metering element operable in a predetermined part throttle position to restrict flow of fluid out of said cylinder to delay full closing of the throttle when said valve is opened.

References Cited in the file of this patent

UNITED STATES PATENTS

| | | |
|---|---|---|
| 2,001,415 | Freeman | May 14, 1935 |
| 2,036,619 | Brown et al. | Apr. 7, 1936 |
| 2,066,667 | Bellis | Jan. 5, 1937 |
| 2,159,772 | Schroedter | May 23, 1939 |
| 2,183,354 | Lange | Dec. 12, 1939 |
| 2,269,204 | Howard | Jan. 6, 1942 |
| 2,810,461 | Seay | Oct. 22, 1957 |
| 2,876,875 | Shaw | Mar. 10, 1959 |